US012354035B2

United States Patent
Garrow et al.

(10) Patent No.: US 12,354,035 B2
(45) Date of Patent: Jul. 8, 2025

(54) GRAPH BASED OPTIMAL MATCHING FOR PEER-TO-PEER VEHICLE SHARING

(71) Applicant: Ford Global Technologies, LLC, Dearborn, MI (US)

(72) Inventors: Sarah Garrow, Coral Gables, FL (US); Yifan Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 18/051,123

(22) Filed: Oct. 31, 2022

(65) Prior Publication Data
US 2024/0144112 A1    May 2, 2024

(51) Int. Cl.
*G06Q 10/02*    (2012.01)
(52) U.S. Cl.
CPC ................... *G06Q 10/02* (2013.01)
(58) Field of Classification Search
CPC ...................................................... G06Q 10/02
See application file for complete search history.

(56) References Cited

U.S. PATENT DOCUMENTS

| | | | |
|---|---|---|---|
| 9,710,975 B2 | 7/2017 | Jefferies et al. | |
| 10,319,167 B1* | 6/2019 | Oesterling | G07C 9/00896 |
| 10,733,550 B2 | 8/2020 | Maheshwari et al. | |
| 2004/0073447 A1* | 4/2004 | Stuart | G07B 15/02 |
| | | | 705/307 |
| 2011/0191126 A1* | 8/2011 | Hampshire | G06Q 10/02 |
| | | | 705/5 |
| 2012/0330696 A1 | 12/2012 | Clark et al. | |
| 2019/0279238 A1* | 9/2019 | Nakano | G06Q 30/0206 |
| 2020/0211070 A1* | 7/2020 | Singh | G06Q 30/0284 |
| 2020/0258018 A1* | 8/2020 | Brady | G06Q 10/06315 |

(Continued)

FOREIGN PATENT DOCUMENTS

| | | | | |
|---|---|---|---|---|
| DE | 102011109695 A1 * | 2/2012 | | G06Q 10/00 |
| KR | 102180881 B1 | 11/2020 | | |

OTHER PUBLICATIONS

Angelopoulos et al., Incentivization Schemes for Vehicle Allocation in One-Way Vehicle Sharing Systems, Oct. 3, 2016 (Year: 2016).*

(Continued)

*Primary Examiner* — Resha Desai
*Assistant Examiner* — Danielle Elizabeth Zevitz
(74) *Attorney, Agent, or Firm* — Emily Drake; Eversheds Sutherland (US) LLP

(57) ABSTRACT

A peer-to-peer (P2P) vehicle sharing method is disclosed. The method may include obtaining a list of rent requests and associated requested rental durations, and a list of available vehicles and associated vehicle availability time periods. The list of rent requests may represent first nodes and the list of available vehicles may represent second nodes of a vehicle-renter graph. The method may further include obtaining a list of edges that connects at least one first node and at least one second node. The method may further include receiving a predefined trigger event and updating the list of edges in response to receiving the predefined trigger event. Furthermore, the method may include transmitting a vehicle reservation notification to at least one renter and at least one vehicle owner based on the updated list of edges.

16 Claims, 9 Drawing Sheets

(56) References Cited

U.S. PATENT DOCUMENTS

2021/0358025 A1* 11/2021 Rosekrans ............... G07C 5/02
2022/0058670 A1    2/2022 Harvey et al.

OTHER PUBLICATIONS

D. Jorge, G. Molnar, and G. Correia. Trip pricing of one-way station based carsharing networks with zone and time of day price variations. Transportation Research Part B, (Year: 2015).*

Robert C. Hampshire et al., Peer-to-Peer Carsharing: Market Analysis and Potential Growth, Transportation Research Record Journal of the Transportation Board, Research Gate, Dec. 2011, 1-9.

* cited by examiner

400

| Node Identifier (ID) | Node Type 0 - Vehicle/Owner 1 - Renter | Start Date | End Date | Match State 0 - Unmatched 1 - Matched | Matched ID (-1) - Unmatched ID of the vehicle/renter matched to | Utilization State | Vehicle Rent Revenue State 0 - No surge pricing 1 - Surge pricing |
|---|---|---|---|---|---|---|---|
| 1 | 1 | 20-Jan-23 | 25-Jan-23 | 1 | 2 | 0 | 0 |
| 2 | 0 | 20-Jan-23 | 30-Jan-23 | 1 | 1 | 0.5 | 1 |
| 3 | 1 | 20-Jan-23 | 30-Jan-23 | 0 | -1 | 0 | 0 |

406 / 408 / 410 / 412 / 414 / 416 / 418 / 426

402

| Renter ID | Vehicle ID | Utilization State |
|---|---|---|
| 1 | 2 | 0.5 |
| 3 | 2 | 1 |

GRAPH BASED OPTIMAL MATCHING FOR PEER-TO-PEER VEHICLE SHARING

TECHNICAL FIELD

The present disclosure relates to a peer-to-peer vehicle sharing system and more particularly to dynamic graph-based optimal matching of a renter and a rent vehicle in a peer-to-peer vehicle sharing system.

BACKGROUND

With the advent of internet and web-based services, rental platforms are growing rapidly across the world. Rental platforms allow sharing or renting of a wide variety of assets, such as vehicles. For instance, peer-to-peer (P2P) vehicle sharing platforms allow users to rent or lease vehicles on a temporary basis. P2P vehicle sharing platforms are beneficial for vehicle owners as they facilitate in generation of additional income, for example, when the vehicle owners are not using their vehicles.

In a conventional vehicle sharing platform, vehicle owners offer their vehicles for rent, and a renter may choose a rent vehicle from the available vehicles that suits the renter's needs. Typically, the renter invests substantial effort in identifying the rent vehicle on conventional vehicle sharing platforms. In addition, identifying the rent vehicle is a time-consuming process, which may be inconvenient for the renter.

The renter may face additional inconvenience if rent vehicles are not available on the vehicle sharing platforms. Specifically, the vehicle sharing platforms need to ensure that abundant rent vehicles are available on the platforms, so that the renter may have options to rent a vehicle. Managing and maintaining vehicle supply on the vehicle sharing platform may be a challenge for the platform operator. While there exists ways to incentivize vehicle owners to offer their vehicles for rent, managing supply is still a challenge for the platform operator.

Thus, there exists a need in the industry for a vehicle sharing/renting system that optimizes vehicle supply and minimizes the effort required for identifying rent vehicles.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 4 depicts snapshots of example tables in the P2P vehicle sharing system in accordance with the present disclosure.

DETAILED DESCRIPTION

Overview

Figure 1:
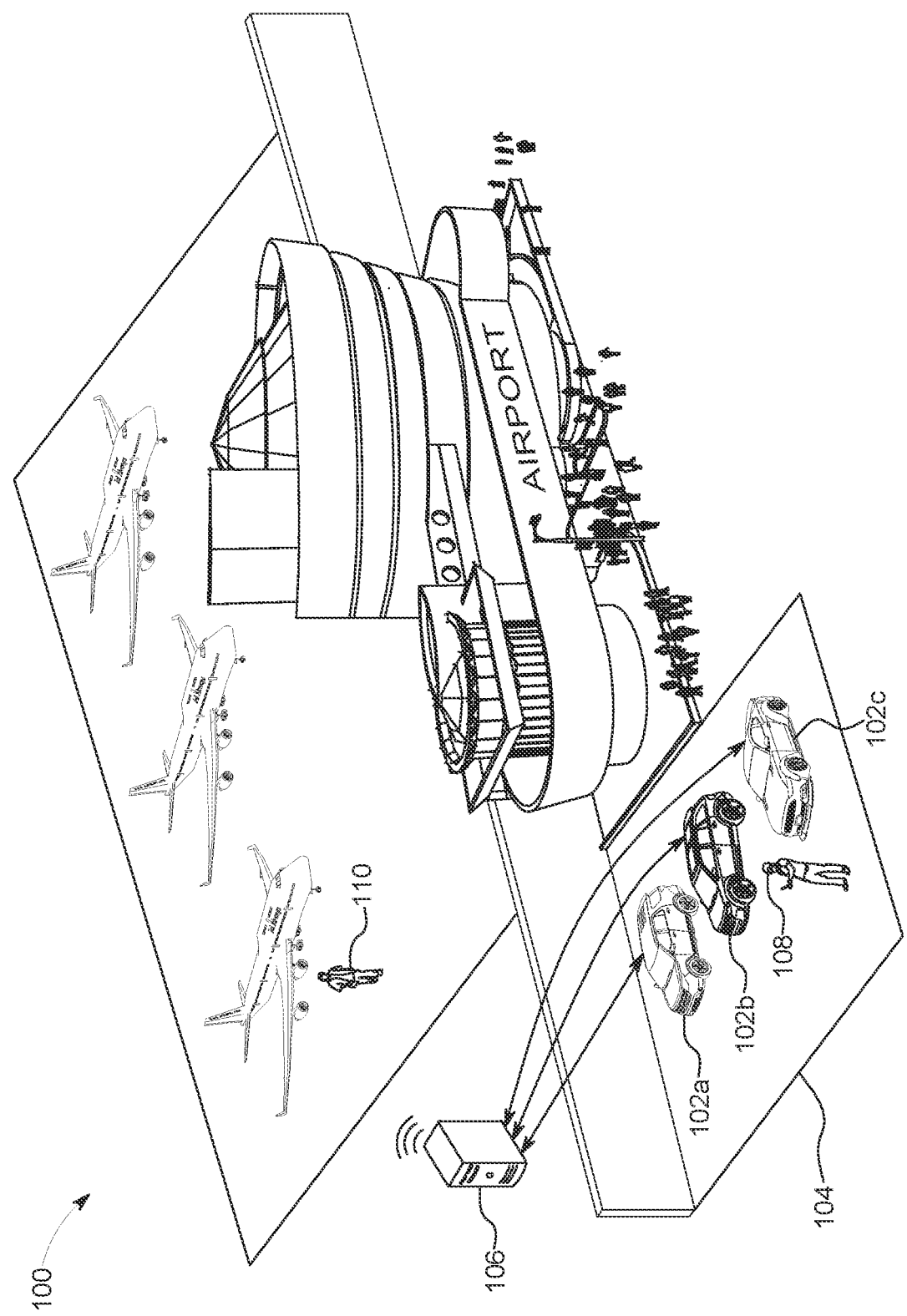
FIG. 1 depicts an example environment in which techniques and structures for providing the systems and methods disclosed herein may be implemented.

The present disclosure describes a P2P vehicle sharing platform that may allow vehicle owners to share their vehicles with a plurality of renters. A renter, who may want to rent a vehicle, may raise a rent request on the P2P vehicle sharing platform. In some aspects, the rent request may include a rental duration for which the renter may require the vehicle, a travel location (e.g., a location/city/airport name from where the renter may want to rent the vehicle), and/or the like. Responsive to receiving the rent request, the P2P vehicle sharing platform may identify an available vehicle or a set of available vehicles that may be available during the rental duration. In a scenario where the P2P vehicle sharing platform identifies more than one available vehicle, the P2P vehicle sharing platform may determine a rental duration overlap extent with availability periods of available vehicles. In some aspects, the P2P vehicle sharing platform may select an available vehicle whose availability period has a maximum overlap extent. The P2P vehicle sharing platform may reserve the selected vehicle for the renter and may transmit a reservation notification to the renter and an owner of selected vehicle.

In some aspects, the P2P vehicle sharing platform may use graph-based approach to select the available vehicle (e.g., a best match vehicle) from the set of available vehicles. In particular, the P2P vehicle sharing platform may generate a vehicle-renter graph of all rent requests and the set of available vehicles (or all the available vehicles). In an exemplary aspect, each rent request/available vehicle may be a node in the vehicle-renter graph. The P2P vehicle sharing platform may further generate edges to connect nodes associated with one or more available vehicles with nodes associated with one or more rent requests. In some aspects, the edges may connect nodes of rent requests with nodes of available vehicles, such that the rent requests may have associated rental durations within the available vehicles' availability time period. The P2P vehicle sharing platform may further select an edge for each rent request (or for each available vehicle.) based on one or more predefined criteria. The P2P vehicle sharing platform may select the edge to determine and reserve a best match available/rent vehicle for each rent request. The predefined criterion/criteria may include vehicle utilization maximization criteria, vehicle rent revenue maximization criteria, and/or the like.

In further aspects, the P2P vehicle sharing platform may dynamically re-evaluate the available vehicle reservation (or re-evaluate the edge selection) based on a receipt of a predefined trigger event. In some aspects, the predefined trigger event may include a new rent request, a new vehicle entry to the set of available vehicles, renter's rent request withdrawal, and/or available vehicle withdrawal by the owner. In some aspects, the P2P vehicle sharing platform may select a new renter for a rented vehicle if the new renter is a better match for the rented vehicle over the existing renter. For example, if the new rental duration overlap extent with the rented vehicle availability period is greater than the existing rental duration overlap extent with the rented vehicle availability period, the P2P vehicle sharing platform may replace the existing renter with the new renter for the rented vehicle. In some aspects, the P2P vehicle sharing platform may replace the existing renter with the next renter when the P2P vehicle sharing platform finds another available vehicle for the existing renter. The P2P vehicle sharing platform may further update the vehicle-renter graph (e.g., update the nodes, edges, and node states included in the vehicle-renter graph), when the P2P vehicle sharing platform replaces the existing renter with the new renter. In some aspects, the P2P vehicle sharing platform may select a new renter/vehicle over the existing renter/vehicle when the new renter/vehicle is a better match (e.g. have higher vehicle or revenue utilization) over the existing renter/vehicle.

The present disclosure provides a P2P vehicle sharing platform that saves renter's time and effort in selecting the best rent vehicle. In addition, the P2P vehicle sharing platform provides an advantage of optimizing vehicle supply as the rent vehicle selection is based on vehicle utilization maximization criteria. Furthermore, the graph-based approach of rent vehicle selection facilitates in increasing computational efficiency in matching a rent vehicle with a rent request, especially while performing re-evaluation of rent vehicle reservation.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a plurality of vehicles 102a, 102b, 102c (collectively referred to as a plurality of vehicles 102) that may be parked at a public place 104. In one or more aspects, the public place 104 may be a parking lot in an airport (as shown in FIG. 1), a train station, a mall, a public parking space, a private parking space and/or the like. In some aspects, the plurality of vehicles 102 may be registered with a peer-to-peer (P2P) vehicle sharing platform 106. The P2P vehicle sharing platform 106 may be hosted on a server and may allow vehicle owners to share their vehicles with others. For instance, an owner 108 of a vehicle 102a may be going out of town for a plurality of days. During these days, as the owner 108 may not use the vehicle 102a, the owner 108 may offer the vehicle 102a for rent through the P2P vehicle sharing platform 106 to a renter (for example, a renter 110). In some aspects, the renter 110 may be travelling to the town, and may need a vehicle (e.g., the vehicle 102a) to rent on a temporary basis.

The owner 108 may register (if not already registered) the vehicle 102a on the P2P vehicle sharing platform 106, to offer the vehicle 102a for rent. The owner 108 may register via an owner device (e.g., a mobile phone, a laptop, a desktop computer, a vehicle infotainment system, and/or the like). The owner 108 may provide a plurality of details, such as owner name, social security number, vehicle details, year of vehicle purchase, owner's bank account details, and/or the like, while registering the vehicle 102a. The vehicle details may include, but are not limited to, vehicle type, brand, model number, color, insurance documents, and the like. In some aspects, the owner 108 may upload vehicle pictures and the insurance documents to the P2P vehicle sharing platform 106, while registering the vehicle 102a.

The owner 108 may further provide details of a duration of time during which the vehicle 102a may be available for rent, when the owner 108 registers the vehicle 102a with the P2P vehicle sharing platform 106. For instance, the owner 108 may provide vehicle availability period details before (e.g., 15 days in advance) the vehicle 102a becoming available.

In a manner similar to the owner 108 registering the vehicle 102a, the renter 110 may register on the P2P vehicle sharing platform 106. The renter 110 may register via a renter device (e.g., a mobile phone, a laptop, a desktop computer, a vehicle infotainment system, and/or the like). The renter 110 may provide renter details (e.g., renter profile), details of vehicle(s) owned by the renter 110, renter preferences, etc., while registering on the P2P vehicle sharing platform 106. The renter profile may include renter name, address, bank account details, social security number, and/or the like. The renter vehicle details may include a type of a vehicle associated with (e.g., owned by) the renter, a vehicle brand, model number, color, renter's license, and/or the like.

The renter 110 may submit/send a request to the P2P vehicle sharing platform 106 for renting a vehicle, from the plurality of vehicles 102, when the renter 110 registers on the P2P vehicle sharing platform 106. The request may include, for example, a rental duration (e.g., a time period for which the renter 110 may require the rent vehicle), a travel location (e.g., a location/city/airport name from where the renter 110 may want to rent the vehicle), and/or the like.

Responsive to receiving the rent request, the P2P vehicle sharing platform 106 may determine a set of available vehicles, from the plurality of vehicles 102, and corresponding availability periods. In some aspects, the set of available vehicles may be the vehicles that may be available for rent during the entire rental duration provided by the renter 110.

In further aspects, the P2P vehicle sharing platform 106 may select and reserve a vehicle (e.g., the vehicle 102a), from the set of available vehicles, for the renter 110 based on the rent request and a plurality of vehicle details corresponding to the set of available vehicles. The vehicle selection process details may be understood in conjunction with FIGS. 2-6.

In some aspects, the P2P vehicle sharing platform 106 may transmit notifications to the renter 110 and the owner 108 (on the respective owner and renter devices) when the P2P vehicle sharing platform 106 reserves the vehicle 102a for the renter 110. In one or more aspects, the notification to the owner 108 may include a request from the renter 110, sent via the P2P vehicle sharing platform 106, for vehicle authorization. The P2P vehicle sharing platform 106 may transmit the notification to the owner 108 before and close to a rental duration start date (e.g., 2 days before the rental duration). Responsive to the notification receipt, the owner 108 may approve the request within a predetermined rental duration (e.g., within 24 hours of notification receipt). In one or more aspect, an agreement for renting the vehicle 102a to the renter 110 may become binding when the owner 108 approves the request.

In some aspects, the notification to the renter 110 may include vehicle identification number (VIN) associated with the vehicle 102a. The P2P vehicle sharing platform 106 may transmit the renter notification before the rental duration start date (e.g., 3 to 5 days before the rental duration) to initiate the request for vehicle authorization, as mentioned above. In one or more aspects, the P2P vehicle sharing platform 106 may transmit the notification to the renter device, so that the renter 110 may view the notification on a renter device display (e.g., display of renter's mobile phone).

On the day of vehicle availability, the owner 108 may park the vehicle 102a at the public place 104 (such as a parking lot of an airport). Further, the owner 108 may send a notification, via the owner device, to the P2P vehicle sharing platform 106 confirming that the vehicle 102a is ready (e.g., available for renting). Furthermore, the owner 108 may provide details of vehicle parking location (such as floor, zone, and/or the like) to the P2P vehicle sharing platform 106. In one or more aspects, the owner 108 may leave a parking ticket inside the vehicle 102a and may lock the vehicle 102a before leaving the vehicle 102a in the public place 104.

On the day of renting, the P2P vehicle sharing platform 106 may navigate the renter 110 to the vehicle parking location (e.g., by using Global Positioning System on the renter device), when the renter 110 arrives at the public place 104. In addition, the P2P vehicle sharing platform 106 may unlock/open vehicle door when the renter 110 reaches near the vehicle 102a. In some aspects, the P2P vehicle sharing platform 106 may determine that the renter 110 has reached the vehicle location by using GPS and/or based on a renter notification indicating that the renter 110 is near the vehicle 102a.

In some aspects, the vehicle 102a may communicatively couple with the P2P vehicle sharing platform 106 via a network (not shown in FIG. 1). The P2P vehicle sharing platform 106 may send a vehicle door unlock command to the vehicle 102a, when the renter 110 reaches near the vehicle 102a.

Responsive to vehicle door opening, the renter 110 may set up the renter device (e.g., renter mobile phone) as a key. The renter 110 may then use the vehicle 102a for the rental duration and may park the vehicle 102a after the rental duration expiry. While leaving the parking, the renter 110 may leave a parking ticket inside the vehicle 102a and may lock the vehicle 102a. The renter 110 may then send, via the renter device, a notification to the P2P vehicle sharing platform 106, informing about the vehicle parking location. Responsive to receiving the renter notification, the P2P vehicle sharing platform 106 may notify the owner 108 that the vehicle 102a is ready to reclaim. Additionally, in some aspects, the P2P vehicle sharing platform 106 may enable a rent payment from the renter 110 to the owner 108 (e.g., via the respective renter and owner bank accounts).

Figure 2:
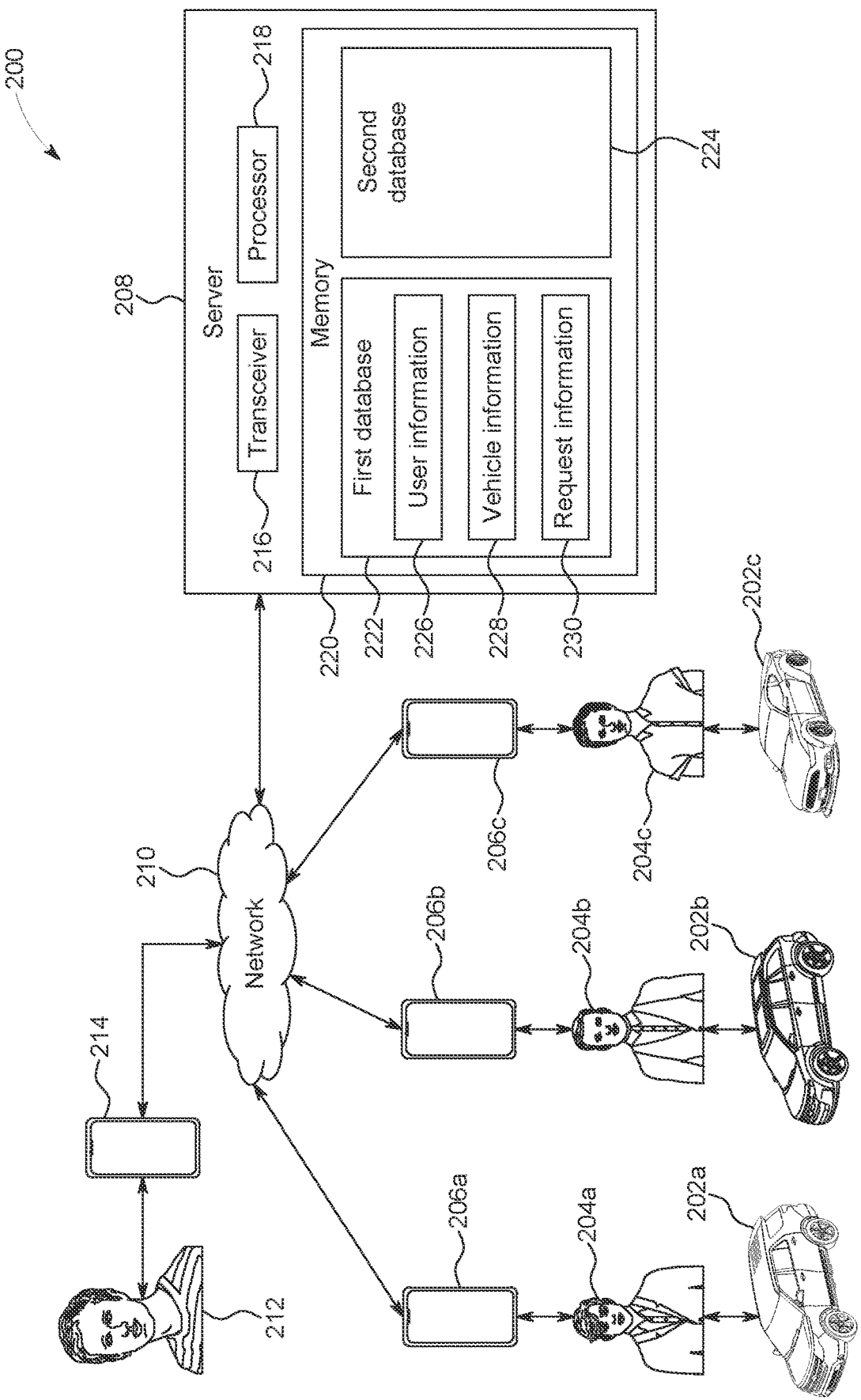
FIG. 2 illustrates an example Peer-to-Peer (P2P) vehicle sharing system in accordance with the present disclosure.

FIG. 2 illustrates an example Peer-to-Peer (P2P) vehicle sharing system 200 (hereinafter referred to as a P2P system 200), in accordance with the present disclosure.

The P2P system 200 may include a plurality of vehicles 202a, 202b, 202c (collectively referred to as a plurality of vehicles 202) associated with owners 204a, 204b, 204c (collectively referred to as vehicle owners 204), respectively. The plurality of vehicles 202 may include, for example, a car, a truck, a sport utility vehicle, a crossover vehicle, a van, a minivan, a taxi, a bus, etc., and may be configured and/or programmed to include various types of automotive drive systems.

The vehicle owners 204 may register their vehicles, via respective vehicle owner devices 206a, 206b, 206c, (collectively referred to as vehicle owner devices 206), on a server 208 to share the plurality of vehicles 202 with other registered owners/users. In particular, the vehicle owner devices 206 and the server 208 may communicatively couple with each other via a network 210. The vehicle owner devices 206 may include, for example, mobile phones, smart phones, mobile nodes, smart watches, scanners, personal digital assistants (PDAs), tablet computers, laptop computers, or the like with communication capabilities.

In some aspects, the server 208 may host a P2P vehicle sharing application that may facilitate the vehicle owners 204 to share their vehicles with other owners/users registered on the P2P vehicle sharing application. The server 208, as described herein, can be implemented in hardware, software (e.g., firmware), or a combination thereof. In one or more aspects, the P2P vehicle sharing application may be accessible on the vehicle owner devices 206, via the network 210.

The P2P system 200 may further include a renter 212 (or renters) who may send a request, via a renter device 214, to the server 208 (e.g., to the P2P vehicle sharing application) to rent a vehicle. The renter device 214 may communicatively couple with the server 208 via the network 210. Renter device 214 examples are similar to the vehicle owner devices 206 examples, described above. In some aspects, the renter 212 may be a vehicle owner as well. For example, the renter 212 may be the owner 204a, 204b, or 204c.

The network 210 may be, for example, a communication infrastructure in which the connected devices discussed in various embodiments of this disclosure may communicate. The network 210 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The server 208 may be part of a cloud-based computing infrastructure and may be associated with and/or include a Telematics Service Delivery Network (SDN) that provides digital data services to the vehicles 202a, 202b, 202c and other vehicles (not shown in FIG. 2), that may be part of a vehicle fleet.

In accordance with some aspects, the server 208 may include a plurality of components including, but not limited to, a transceiver 216, a processor 218, and a memory 220, which may communicatively couple with each other. The memory 220 may store programs in code and/or store data for performing various P2P vehicle sharing application operations, in accordance with the present disclosure. Specifically, the processor 218 may be configured and/or programmed to execute computer-executable instructions stored in the memory 220 for performing various P2P vehicle sharing application functions in accordance with the disclosure. Consequently, the memory 220 may be used for storing code and/or data code and/or data for performing operations in accordance with the present disclosure.

In one or more aspects, the processor 218 may be disposed in communication with one or more memory devices (e.g., the memory 220 and/or one or more external databases (not shown in FIG. 2)). The memory 220 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The memory 220 may be one example of a non-transitory computer-readable medium and may be used to store programs in code and/or to store data for performing various operations in accordance with the disclosure. The instructions in the memory 220 can include one or more separate programs, each of which can include an ordered listing of computer-executable instructions for implementing logical functions.

The memory 220 may include one or more databases such as a first database 222 and a second database 224, which may communicatively couple with each other. In some aspects, the second database 224 may include a subset of information stored in the first database 222. The details of the first database 222 and the second database 224 are described later in the description below.

In some aspects, the transceiver 216 may be configured to receive a plurality of inputs associated with the vehicle owners 204 and the renter 212, via the vehicle owner devices 206 and the renter device 214 respectively. In some aspects, the vehicle owners 204 and the renter 212 may send the plurality of inputs to the transceiver 216 during the registration process on the server 208. For instance, the plurality of inputs associated with the vehicle owners 204 may include the plurality of vehicles 202 details, owner details (name, address, bank account details, etc.), and/or the like. The vehicle details may include, for example, vehicle type, brand, model number, color, vehicle insurance documents, and/or the like. In some aspects, the vehicle owners 204 may transmit (e.g., by uploading) vehicle pictures and the insurance documents to the transceiver 216.

Similarly, the plurality of inputs associated with the renter 212 may include renter details (name, address, bank account details, etc.), and details of vehicle(s) associated/owned by the renter 110. The renter vehicle details may include vehicle type, brand, model number, color, and renter's license. In some aspects, the renter 212 may upload pictures of his license and other documents to the server 208 (e.g., via the transceiver 216).

In some aspects, the transceiver 216 may be configured to transmit the received owner details and the renter details, from the vehicle owners 204 and the renter 212 respectively, to the first database 222 as a user information 226, for storage purpose. The information stored in the first database 222 may be stored as records in a request table 400 shown in FIG. 4. The request table 400 is described in detail later in the description below.

The transceiver 216 may be further configured to receive vehicle availability information for the plurality of vehicles 202 from the respective vehicle owners 204, via the vehicle owner devices 206. The vehicle availability information may include information on the days on which the respective plurality of vehicles 202 may be available for rent/sharing. For example, the owner 204a may send the vehicle 202a availability information to the transceiver 216, informing that the vehicle 202a may be available for rent from December 1 to December 10.

Responsive to receiving the vehicle availability information, the transceiver 216 may send the information to the first database 222 as a vehicle information 228, for storage purpose. The vehicle availability information may be stored as records in the request table 400. In further aspects, the memory 220 may be configured to store information associated with the plurality of vehicles 202 in the vehicle information 228. In particular, the vehicle information 228 may include the vehicle type, brand, model number, color, and/or the like, associated with the plurality of vehicles 202. In additional aspects, the transceiver 216 may transmit an available vehicle offer date (e.g., a date on which a vehicle is added on the server 208 for renting purpose) to the first database 222 as the vehicle information 228, for storage purposes.

The transceiver 216 may be further configured to receive a plurality of requests from the renters 212, via the renter devices 214, to rent vehicles. The request may include a rental duration travel location. For instance, the renter 212 may send a request to the transceiver 216 to rent a vehicle in Georgia. The renter 212 may indicate that the renter 212 requires the vehicle for fixed dates (for example, for one week from December 1 to December 7).

Responsive to receiving the rent request(s), the transceiver 216 may send the rent request details to the first database 222 as a request information 230, for storage purpose. The rent request details may be stored as records in the request table 400.

The processor 218 may be configured to receive/fetch the plurality of inputs, the rent requests details (e.g., a list of rent requests and associated rental durations), and the vehicle availability information (e.g., a list of available vehicles and associated vehicle availability time periods), etc., from the memory 220, when the transceiver 216 receives such information. The processor may additionally obtain vehicle information for the list of available vehicles, including available vehicle identification number (VIN), vehicle type, vehicle model number and/or the like, from the memory 220.

In operation, the processor 218 may obtain the list of available vehicles (from the plurality of vehicles 202) from the memory 220 when the renter 212 sends the rent request to the transceiver 216. The processor 218 may compare the rental duration (included in the rent request) with the plurality of vehicles 202 availability periods (specifically, availability period associated with each vehicle), and may determine the list of available vehicles that are available during the rental duration. For example, if the rental duration is December 1 to December 7, and the vehicles 202a and 202b are available for rent during the entire rental duration, however the vehicle 202c is not, then the processor 218 may determine the vehicles 202a and 202b as the list of available vehicles for the renter 212.

In a scenario when no vehicle is available during the rental duration, the processor 218 may notify (via the transceiver 216) the renter 212 accordingly. In further aspects, when only one vehicle (e.g., the vehicle 202a) is available, then the processor 218 may reserve the available vehicle for the renter 212 and may transmit a notification to the renter 212 (e.g., on the renter device 214) and the corresponding owner (e.g., on the vehicle owner device 206a) that the vehicle 202a is reserved. The processor 218 may transmit the notification via the transceiver 216.

In some aspects, when more than one vehicle (e.g., the vehicles 202a and 202b) are available during the rental duration, the processor 218 may be configured to determine and select (e.g., reserve) a best rent vehicle for the renter 212. In such scenarios, the vehicles (such as the vehicles 202a and 202b) may be potential matches for the renter 212 associated with the rent request, and the processor 218 may be configured to select a best/final match (i.e., a best rent vehicle from the vehicles 202a and 202b) for the renter 212. In some aspects, the processor 218 may select the best rent vehicle based on a rental duration overlap extent with the vehicle availability period (to maximize vehicle utilization), vehicle rent offer date, vehicle rent revenue, and the plurality of inputs (such as the available vehicle types and the vehicle type owned by the renter 212). For example, the processor 218 may select the vehicle that has the corresponding vehicle type (e.g., vehicle model) same as a vehicle type owned by the renter 212.

Responsive to determining the best rent vehicle, the processor 218 may send a notification to the renter 212 and the corresponding vehicle owner. This may allow the renter 212 to receive the reservation notification for only one vehicle (e.g., the best match vehicle), and the renter 212 does not have to spend time and effort in selecting/reserving the rent vehicle. The process of best rent vehicle determination and selection may be understood as follows. In some aspects, the processor 218 may use a graph-based approach to determine the best rent vehicle. The graph-based approach may be understood in conjunction with FIG. 3.

Figure 3:
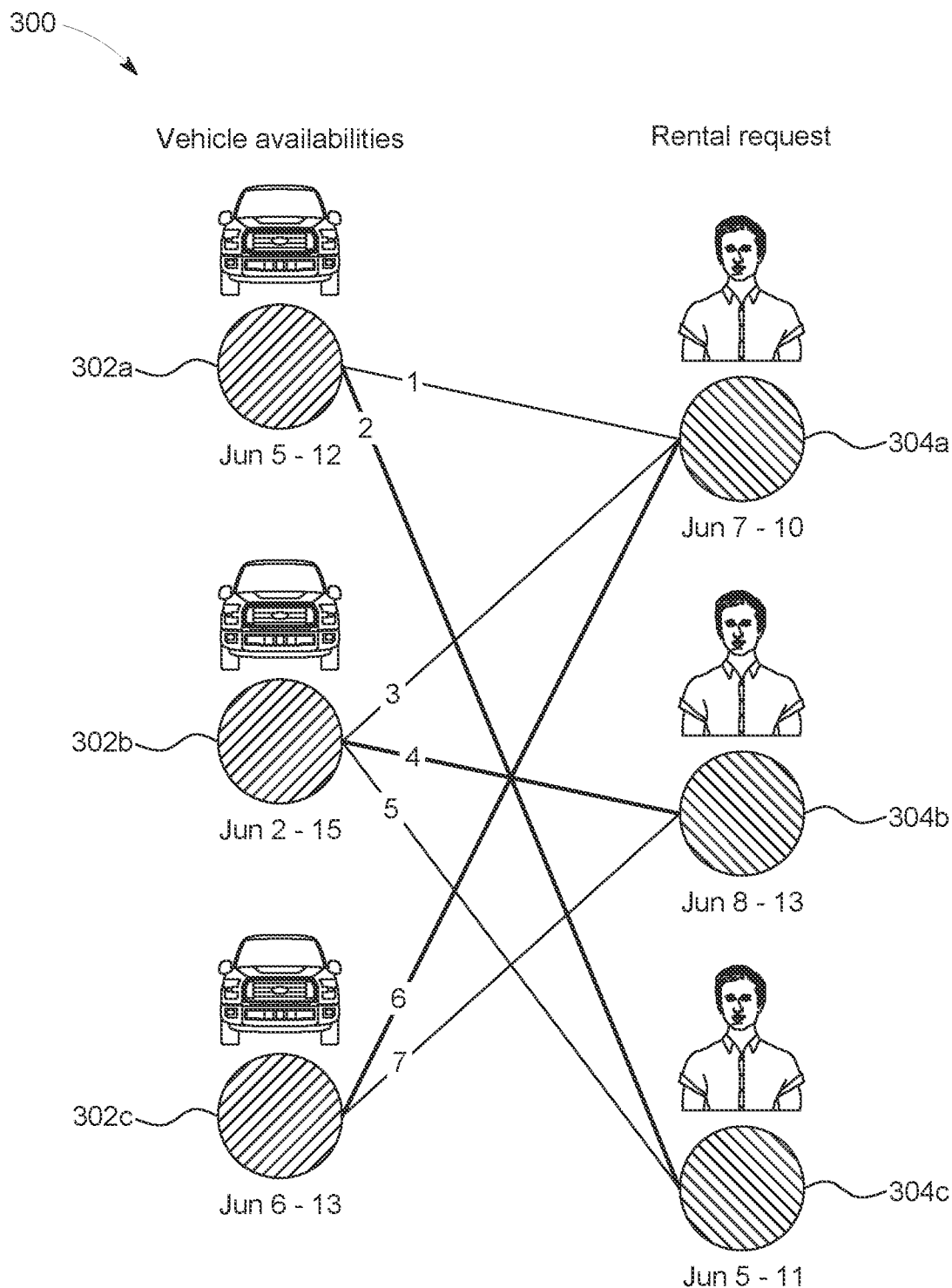
FIG. 3 depicts an example vehicle-renter graph, in accordance with the present disclosure.

FIG. 3 depicts an example vehicle-renter graph 300 (hereinafter referred to as a graph 300), in accordance with the present disclosure. The graph 300 may have a first plurality of nodes 302a, 302b, 302c (collectively referred to as nodes 302) and a second plurality of nodes 304a, 304b, 304c (collectively referred to as nodes 304). The first plurality of nodes 302 may be associated with the available vehicles (or vehicle owner(s) 204) and the second plurality of nodes 304 may be associated with the rent requests (or renter(s) 212).

The processor 218 may be configured to store information associated with the graph 300 (including the first plurality of nodes 302 and the second plurality of nodes 304) in the first database 222. The processor 218 may store the graph information as records in the request table 400. In some aspects, the processor 218 may assign unique identifiers (or node identifiers) to each node (the first plurality of nodes 302 and the second plurality of nodes 304) in the graph 300. The processor 218 may further store node information corresponding to the node identifiers in the request table 400.

In further aspects, the processor 218 may be configured to generate one or more edges (such as edges 1-7) between at least one first node and at least one second node. In particular, the one or more edges may connect one or more available vehicles to one or more rent requests. More particularly, the processor 218 may generate edges between nodes (e.g., the second node 304a) of rent requests and nodes (e.g., the first node 302a) of available vehicles, such that the requested rental durations associated with the rent requests are subset of the vehicle availability time periods associated with the available vehicles.

In some aspects, the processor 218 may be configured to determine whether an available vehicle matches at least one rent request criteria (e.g., requested rental durations being subset of the available vehicle's availability time period) of one or more rent requests. Based on a determination that the available vehicle matches the rent request criteria, the processor 218 may generate one or more edges to indicate that the available vehicle matches the rent request criteria for the respective rent requests. Stated another way, the processor 218 may generate edges to determine "potential matches" between the one or more available vehicles and the one or more rent requests, based on the requested rental durations and the vehicle availability time periods. Hence, a node associated with the available vehicle may include more than one edges (each edge connected to the node associated with the rent request matching the rent request criteria). A person ordinarily skilled in the art may appreciate that since the graph 300 may be partially connected and not fully connected (e.g., no node associated with available vehicle is connected with a node associated with another available vehicle; similarly, no node associated with a rent request is connected with a node associated with another rent request), the graph-based approach of matching vehicles with rent requests is scalable to a larger number of rent requests.

In an exemplary aspect, the vehicle associated with the node 302a may be available between June 5-June 12, the vehicle associated with the node 302b may be available between June 2-June 15, and the vehicle associated with the node 302c may be available between June 6-June 13. Further, the renters 212 may have submitted the rent request (represented as the node 304a) for a rental duration between June 7-June 10, the rent request associated with node 304b for a rental duration between June 8-June 13, and the rent request associated with node 304c for a rental duration between June 5-June 11. In this case, the processor 218 may generate edges 1 and 2 to connect the node 302a with the nodes 304a and 304c, as the requested rental durations associated with the requests associated with nodes 304a and 304c is within (or is subset of) the vehicle availability time period associated with the vehicle or node 302a. Stated another way, the vehicle associated with the node 302a potentially matches with the rent requests associated with the nodes 304a and 304c, as the vehicle associated with the node 302a is available on all the days mentioned in the rent requests associated with the nodes 304a and 304c. The vehicle associated with the node 302a does not potentially match with the rent request associated with the node 304b, as the vehicle associated with the node 302a is not available on June $13^{th}$. Thus, the processor 218 may not generate an edge between the node 302a and the node 304b.

Similarly, the processor 218 may generate edges 3, 4, and 5 to connect the node 302b with the rent requests/nodes 304a, 304b, and 304c as the vehicle associated with the node 302a is available on all the days mentioned in the rent requests associated with the nodes 304a, 304b, and 304c. Further, the processor 218 may generate edges 6 and 7 to connect the node 302c with the rent requests/nodes 304a and 304b and not with 304c, as the vehicle associated with the node 302c is not available on June $5^{th}$. In some aspects, there may be a node with no edge. For example, if there is a rent request for a rental duration between December 30-January 2 and there is no available vehicle during this period (as all the vehicles may be rented), there may be no edge for the rent request. Further, a person ordinarily skilled in the art may appreciate that the edges exist between the nodes 302 and 304, and there may not be an edge within the nodes 302 or within the nodes 304.

The processor 218 may be configured to store the generated edges in the second database 224. In some aspects, the processor 218 may store the generated edges (e.g., a list of generated edges) as records in an edge table 402, as shown in FIG. 4. The edge table 402 may store the list of edges in association with the node identifiers of nodes that the edges may connect. In further aspects, the processor 218 may store edge information associated with the list of edges in the first database 222. In some aspects, the processor 218 may store the edge information as records in the request table 400, as shown in FIG. 4. In some aspects, the processor 218 may be configured to obtain the list of edges stored in the edge table 402 from the second database 224.

In further aspects, the processor 218 may be configured to determine and select an edge for each rent request (or for each available vehicle) that may offer a best match for the rent request/available vehicle. Stated another way, the processor 218 may determine and select a best/final match available vehicle (from all the potentially matched vehicles)

for each rent request by selecting an edge. For example, as discussed above, the processor 218 may generate two edges 1 and 2 that connect the vehicle associated with the node 302a with the rent requests associated with the nodes 304a and 304c. The processor 218 may select one edge (either edge 1 or edge 2) to rent the vehicle associated with the node 302a. In other words, the processor 218 may reserve the vehicle associated with the node 302a for either the rent request associated with the node 304a or the rent request associated with the node 304c.

The processor 218 may determine and select the edge based on one or more predefined criteria. The predefined criteria may include one or more of maximization of vehicle utilization, maximization of vehicle rent revenue, available vehicle rent offer dates (i.e., giving preference to vehicle/request added before others), maximization of a count of matches in the graph 300 and/or the like. In some aspects, the processor 218 may give preference to reserving the vehicle that may have been added to the P2P system 200 before others, to ensure that a maximum number of vehicles in the P2P system 200 are reserved. The edge selection may be further understood in conjunction with FIG. 5.

In some aspects, the processor 218 may select the edge (i.e., the best/final match vehicle/renter) based on Mixed Integer Linear Program. In particular, the Mixed Integer Linear Program may be an objective function of a maximum number of matches (i.e., to match maximum number of available vehicles in the server 208), maximum vehicle utilization, available vehicle rent offer dates/rent requests offer dates (i.e., giving preference to vehicle/request added before others), maximum vehicle rent revenue and/or the like. In one or more aspects, the Mixed Integer Linear Program may be a weighted sum of above-mentioned parameters. An exemplary Mixed Integer Linear Program is shown below:

$$\max\left(w_1 \frac{\sum_{i \in N} x_m^i}{N} + w_2 \sum_{i \in N} x_u^i + w_3 \sum_{i \in N} x_m^i (N-i)\right)$$

Where:
N is set of nodes
$x_m$ is match state (i.e., whether a match exists for the vehicle or the rent request), where $x_m(t) \in \{0,1\}$
  0: unmatched
  1: matched
$x_u$ is utilization state (which may be a ratio of requested rental duration and vehicle availability period of time), where $x_u(t) \in [0,1]$
w1, w2, w3 are weights, where w1, w2, and w3 may be selected based on user preferences or statically by the server 208
$x_r$ is node type (renter/vehicle owner), where $x_r \in \{0,1\}$
  0: vehicle owner
  1: renter
i represents index
$e_{ij}$ represents edge state, where $e_{ij}(t) \in [0,1]$
  0: unconnected
  1: connected $$\frac{\sum_{i \in N} x_m^i}{N}$$

represents a function to maximize number of matches
$\sum_{i \in N} x_u^i$ represents a function to maximize vehicle utilization
$\sum_{i \in N} x_m^i (N-i)$ represents a function to give preference to matching vehicles/requests added before others $$x_m^i[t] = \sum_{j \neq i, j \in N} e_{ij} \forall i \in N$$

represents match state $$x_u^i[t] = \sum_{j \neq i, j \in N} e_{ij} u_{ij} (1 - x_r) \forall i \in N$$

represents vehicle owner utilization

Responsive to the edge selection, the processor 218 may reserve the identified available vehicle for the rent request. For example, when the processor 218 selects the edge 2, the processor 218 may reserve the vehicle associated with the node 302a for the rent request associated with the node 304c. Similarly, when the processor selects the edge 4, the processor 218 may reserve the vehicle associated with the node 302c for the rent request associated with the node 304b, and so on. In some aspects, the processor 218 may send, via the transceiver 216, vehicle reservation notifications to the vehicle owners and the corresponding matched renters, when the processor 218 reserves the vehicles based on the edge selection.

Further, the processor 218 may store edge selection information in the second database 224. In some aspect, the processor 218 may store the edge selection information in the first database 222 as well.

In some aspects, the processor 218 may be further configured to update the list of edges. In particular, the processor 218 may update the list of edges when the processor 218 receives or obtains a predefined trigger event. In some aspects, the processor 218 may obtain the predefined trigger event from the vehicle owner devices 206 or the renter devices 214, via the transceiver 216. The predefined trigger event may include at least one of a new rent request entry, a new available vehicle entry, an existing available vehicle withdrawal, or an existing rent request withdrawal.

In particular, when the processor 218 receives/obtains the predefined trigger event, the processor 218 may update the first database 222 (i.e., update the list of rent requests and/or list of available vehicles). For example, when the processor 218 receives a new available vehicle entry, the processor 218 may add the new available vehicle in the server 208 as a new node, and update the first database 222 (i.e., add another node and node identifier in the first database 222) and may update the request table 400. The processor 218 may then identify potential matches for the new available vehicle entry. Stated another way, the processor 218 may identify all the rent requests in which the requested rental duration is within new vehicle availability time periods. The processor 218 may further store the potential matches in the first database 222, and may add the potential matches as new edges in the edge table 402 to form an updated edge table 402.

Responsive to adding the new edges in the edge table 402, the processor 218 may obtain the list of edges stored in the updated edge table 402 and perform rent vehicle reservation re-evaluation to identify best/final matches for all nodes in the graph 300, based on the edges in the updated edge table 402.

A person ordinarily skilled in the art may understand that performing the reservation re-valuation using the edge table 402 (instead of request table 400) increases server 208 computational efficiency. This is because the edge table 402 only stores edge information (which may be a subset of information stored in the request table 400). The process of rent vehicle reservation re-evaluation may be understood in conjunction with FIGS. 4 and 5A-5G described below.

In some aspects, when the processor 218 performs the reservation re-valuation, the processor 218 may identify best/final matches for all the nodes in the graph 300, such that no existing "matched" rent request/available vehicle goes to "unmatched" state. Further, the processor 218 may update final matches for all the nodes, such that the updated final matches offer same or better outcome (e.g., better vehicle or revenue utilization) to the renters/vehicles.

FIG. 4 depicts snapshots of example tables in the P2P vehicle sharing system 200 in accordance with the present disclosure. In particular, FIG. 4 depicts an exemplary request table 400 and an exemplary edge table 402. The request table 400 may include information stored in the first database 222 and the edge table 402 may include information stored in the second database 224.

For example, the request table 400 may store the node identifiers 406 (unique identification numbers or IDs) associated with the first plurality of nodes 302 and the second plurality of nodes 304. The node identifiers may be a number, alphabet, or alphanumeric number. For example, the node identifiers 406 may be a number, as shown in the request table 400 and the edge table 402. In some aspects, the request table 400 and the edge table 402 may indicate whether the node identifier is associated with available vehicle or rent requests, as shown as column 408 in FIG. 4.

In some aspects, the request table 400 may further include the list of rent requests and associated requested rental durations (shown as columns 410 and 412), and the list of available vehicles and associated vehicle availability time periods (shown as the columns 410 and 412). For example, the request table 400 indicates that the vehicle having ID "2" may be available between Jan. 20, 2023 and Jan. 30, 2023. Further, the request table 400 indicates a rent request having ID "1") may have an associated requested rental duration between Jan. 20, 2023, and Jan. 25, 2023.

The request table 400 may further indicate whether there exists an edge for the corresponding node identifier. Stated another way, the request table 400 may indicate whether there exists a match (or indicates final match status, shown as column 414 in FIG. 4) for each node identifier. For example, the request table 400 indicates that there exists a best/final match for the rent request ID "1" and for the vehicle ID "2", and not for the rent request ID "3".

In a scenario when the processor 218 identifies the best/final match, the processor 218 may further indicate corresponding match ID in the request table 400, shown as column 416 in FIG. 4. For example, the request table 400 indicates that the vehicle having ID "2" may be matched to the rent request having ID "1". The request table 400 may further indicate utilization state for each node, shown as column 418 in FIG. 4. The utilization may be a ratio of the requested rental duration and the vehicle availability time period. For example, the utilization state for the vehicle having ID "2" may be 0.50, as the vehicle is available for 10 days and the number of rental days (or requested rental duration) for the matched rent request is 5 days. In other words, the renter needs the vehicle for 5 days and the vehicle is available for 10 days. Hence, the vehicle can only be utilized for 5 days in this case, and thus the utilization state is 0.50.

In some aspects, the request table 400 may also include a vehicle rent revenue state for each matched vehicle, shown as column 426 in FIG. 4. The vehicle rent revenue state may be based on demand or surge pricing. For instance, the memory 220 may store information associated with surge or demand pricing that may indicate when and where surge pricing exists, for example, for different rent days (weekdays/weekends/holidays), rent time, rent location (such as busy locations). The processor 218 may obtain the surge pricing information from the memory 220 and determine whether surge pricing may be applicable on one or more days when the vehicle is available for rent. When the processor 218 determines that surge pricing may be applicable, the processor 218 may match the vehicle with a rent request that may have associated requested rental duration including the days in which the surge pricing is applicable. In this manner, the processor 218 may maximize revenue earning for the vehicle owner.

In some aspects, the column 426 may indicate "1" when surge pricing is applicable on at least one day when the vehicle is available for rent. When surge pricing is not applicable on any day when the vehicle is available, the column 426 may indicate "0".

In accordance with the present disclosure, the edge table 402 may include a subset of information stored in the request table 400. For example, the edge table 402 may store edge information associated with the first plurality of nodes 302 and the second plurality of nodes 304. In particular, the edge table 402 may include information of all the edges (i.e., all the potentially matched rent requests/vehicles) formed between the first plurality of nodes 302 and the second plurality of nodes 304. For example, the edge table 402 may include details of edges 1-7 discussed in conjunction with FIG. 3.

FIG. 4 depicts that the edge table 402 includes the edges captured in the request table 400. In particular, the edge table 402 may include nodes (node identifiers, as renter ID and vehicle ID) associated with the formed edges, along with the utilization state of each edge, shown as columns 420-424 in FIG. 4. The nodes for which no edge is formed (i.e., no potential match is found) may not be stored in the edge table 402.

As described above, the processor 218 may update the potential matches/edges in the edge table 402 when the processor 218 receives/obtains the predefined trigger event. In other words, the edge table 402 may be dynamic and may update based on the predefined trigger event. In some aspects, the processor 218 may further update the request table 400 based on the predefined trigger event. The details of updating the request table 400 and the edge table 402 may be understood in conjunction with FIGS. 5A-5G.

FIGS. 5A-5G illustrate different examples for reserving a vehicle in the P2P vehicle sharing system 200, in accordance with the present disclosure. As described above, when the processor 218 receives/obtains the predefined trigger event, the processor 218 may update the request table 400 and/or the edge table 402. For example, when the processor 218 receives/fetches a new vehicle 1 (shown in FIG. 5A) in the server 208, the processor 218 may add an entry the new vehicle 1 in the request table 400 (or add a node in the graph 300). The processor 218 may further assign a unique identifier to the new vehicle 1. The processor 218 may further determine whether vehicle availability period associated with the new vehicle 1 matches with requested rental duration of a rent request. As there is no rent request in the server 208 in the example shown in FIG. 5A, there is no potential match for the new vehicle 1.

Figure 5A:
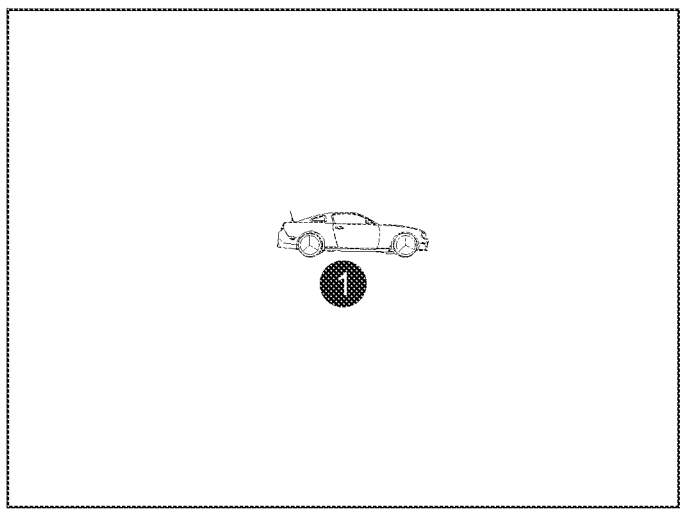
FIGS. 5A-5G illustrate aspects of reserving a vehicle in the P2P vehicle sharing system in accordance with the present disclosure.
Figure 5A:
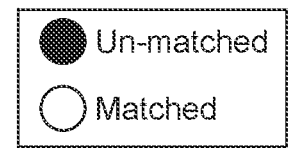
Figure 5B:
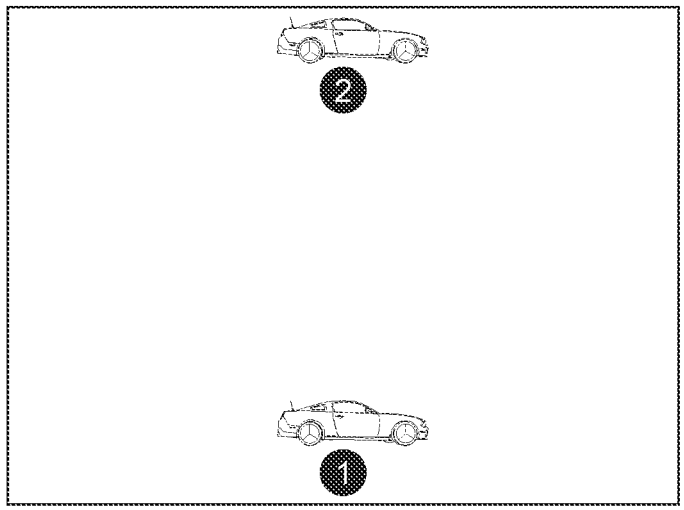
Figure 5B:
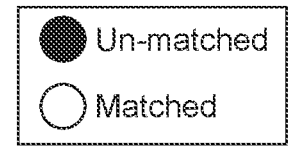
Figure 5C:
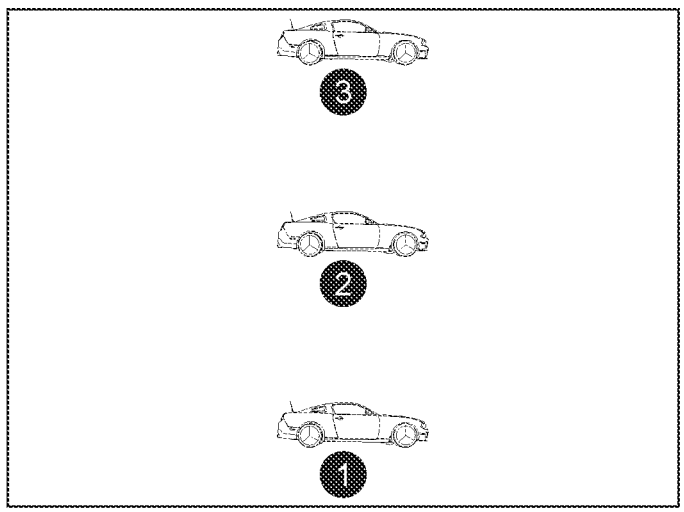
Figure 5C:
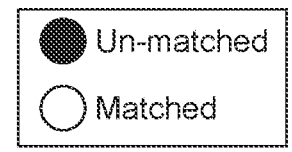

FIGS. 5B and 5C indicate entries of two more vehicles 2 and 3 in the server 208. The processor 218 may add entries of vehicles 2 and 3 in the request table 400 (or add nodes in the graph 300). As there is no rent request in the server 208 in the examples shown in FIGS. 5B and 5C, there is no potential match for the new vehicles 2 and 3.

Figure 5D:
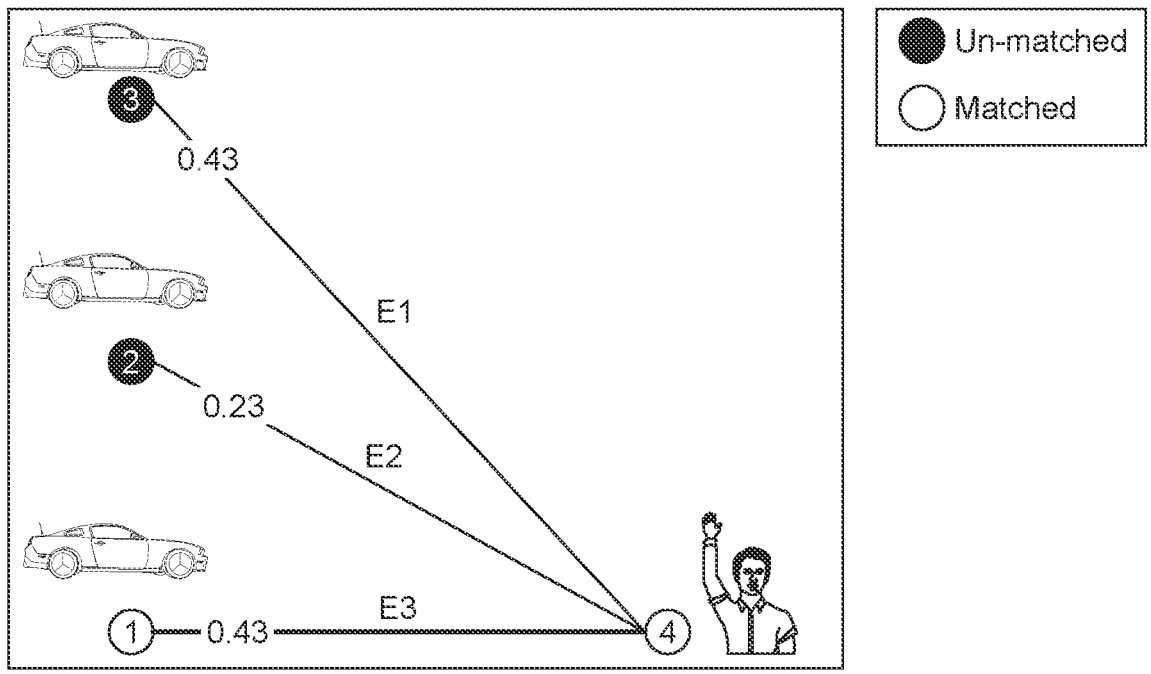

FIG. 5D depicts an entry of a new rent request 4. Responsive to the entry of new rent request 4, the processor 218 may add an entry of new rent request 4 in the request table 400 (or add a node in the graph 300). The processor 218 may add the new request in the first database 222. The processor 218 may then identify an available vehicle (or generate one or more edges) for the new rent request. In particular, the processor 218 may determine if the requested rental duration associated with the new rent request 4 is within the vehicle availability time period associated with any available vehicle (vehicles 1-3, i.e., "potential matches") in the server 208. When the processor 218 identifies potential matches for the new rent request 4, the processor 218 may update the second database 224 (or the edge table 402). In other words, the processor 218 may add the information associated with the new rent request 4 and the potentially matched available vehicle(s) in the second database 224.

For example, FIG. 5D indicates that the new rent request 4 potentially matches with all the available vehicles 1-3, and thus the processor 218 may form three edges E1-E3 and store edge information in the edge table 402. In particular, the processor 218 may add node identifiers associated with the vehicles 1-3 and node identifier associated with the new rent request in the edge table 402. The processor 218 may further determine utilization state of each edge. For instance, the utilization state of E1 is 0.43, E2 is 0.23, and E3 is 0.43.

The processor 218 may additionally determine a best/final match (a best available vehicle) for the rent request 4. In some aspects, the processor 218 may determine the best available vehicle (or select one edge out of E1-E3) based on the predefined criteria, as discussed above. For example, the processor 218 may select an edge having maximum vehicle utilization. Since E1 and E3 have same utilizations in FIG. 5D, the processor 218 may select E3 as the best match for the rent request 4, as the vehicle 1 was added or offered first for rent on the server 208. In other aspect, the processor 218 may select E3 irrespective of the utilization state, as the vehicle 1 was offered/added first on the server 208. In other words, the processor 218 may select the vehicle 1 for the rent request as the rent offer date of vehicle 1 is prior to the rent offer dates of vehicles 2 and 3.

Figure 5E:
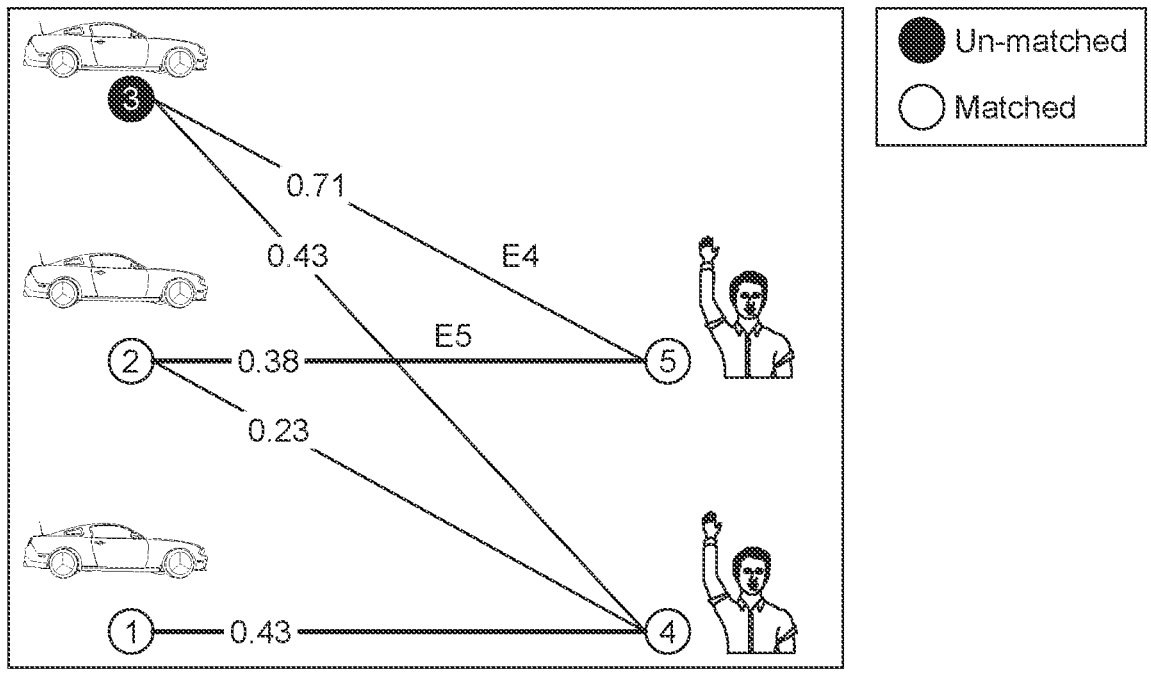

FIG. 5E depicts another example in which a new rent request 5 may be added to the server 208. The processor 218 may add/enter the new request 5 in the request table 500, as discussed above. Further, the processor 218 may generate the edges between the vehicles 1-3 and the rent requests 1-2 to identify potential matches for each rent request or each available vehicle. Furthermore, the processor 218 may perform rent reservation re-evaluation to identify best matches for each rent request or available vehicle. In this example, the processor 218 may match the vehicle 1 (as best/final match) with the rent request 4. For the rent request 5, the processor 218 may generate two edges E4 and E5 (as potential matches). E4 may connect the rent request 5 with the vehicle 3, and E5 may connect the rent request 5 with the vehicle 2. E4 may have an associated utilization of 0.71 and E5 may have an associated utilization of 0.38. In this scenario, the processor 218 may select E5 as the best match, although E4 may have higher utilization. This may be because the vehicle 2 rent offer date is before the vehicle 3 rent offer date. Stated another way, the vehicles that are offered first on the server 208 for rent may be allocated first, irrespective of the associated edge utilization.

A person ordinarily skilled in the art may appreciate that by allocating vehicles that are offered first on the server 208 for rent requests, the present disclosure may ensure that most available vehicles on the server 208 are matched with renter(s) on the server 208. In this manner, the present disclosure ensures a higher vehicle allocation/rent rate on the server 208, and thus incentivizes vehicle owners to offer their vehicles for rent on the server 208. Stated another way, since a higher percentage of vehicles is matched with renter(s), owners have a higher percentage probability of their vehicles being rented out.

Figure 5F:
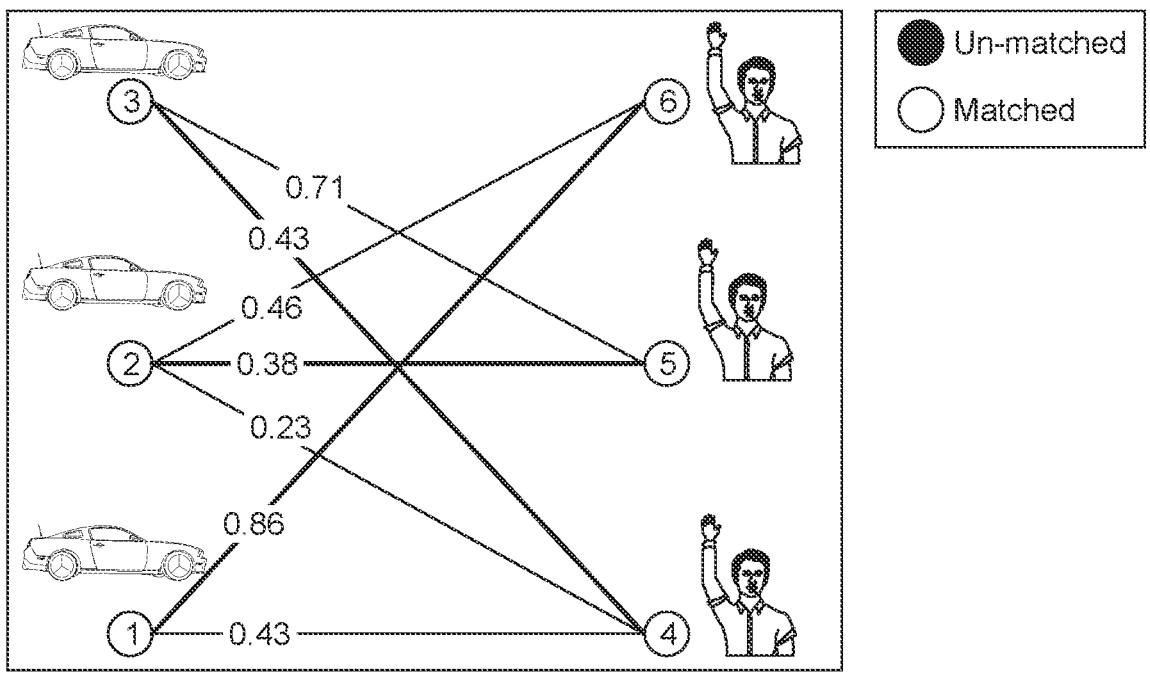

FIG. 5F depicts another example of vehicle sharing. In this case, another rent request 6 may be added to the server 208. The processor 218 may add the rent request 6 in the request table 400. The processor 218 may again form edges for all the entries (i.e., for all the vehicles 1-3 and all the rent requests 4-6 and perform rent reservation re-evaluation) as described above and update the edges in the edge table 402. Since in this case there are three vehicles 1-3 against three rent requests 4-6, the processor 218 may determine best matches based on maximum vehicle utilization. In other aspects, the processor 218 may determine best matches based on maximum vehicle rent revenue.

Similarly, when the processor 218 receives an existing available vehicle withdrawal request or an existing rent request withdrawal request on the server 208, the processor 218 may remove entries associated with the existing available vehicle or the existing rent request from the first database 222 (or the request table 400). In addition, when edge entries associated with the existing available vehicle withdrawal or the existing rent request withdrawal are present in the second database 224 (or the edge table 402), the processor 218 may remove the edge entries from the second database 224 (or the edge table 402). The processor 218 may further perform the edge selection using the updated first database 222 and the second database 224.

Figure 5G:
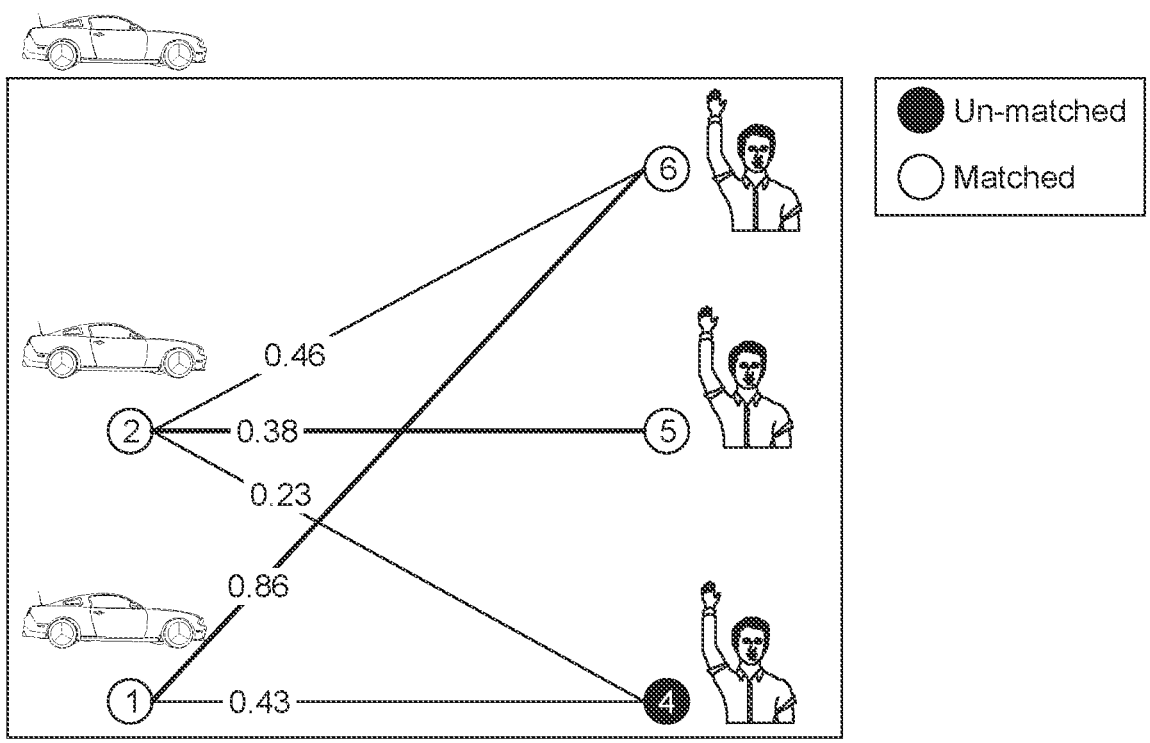

FIG. 5G depicts an example withdrawal of vehicle 3 from the server 208. In this scenario, the processor 218 may update the request table 400 by removing entries associated with vehicle 3 from the request table 400 and the edge table 402. The processor 218 may further generate edges between the current available vehicles (e.g., vehicles 1 and 2) and rent requests (e.g., rent requests 4, 5 and 6).

Figure 6:
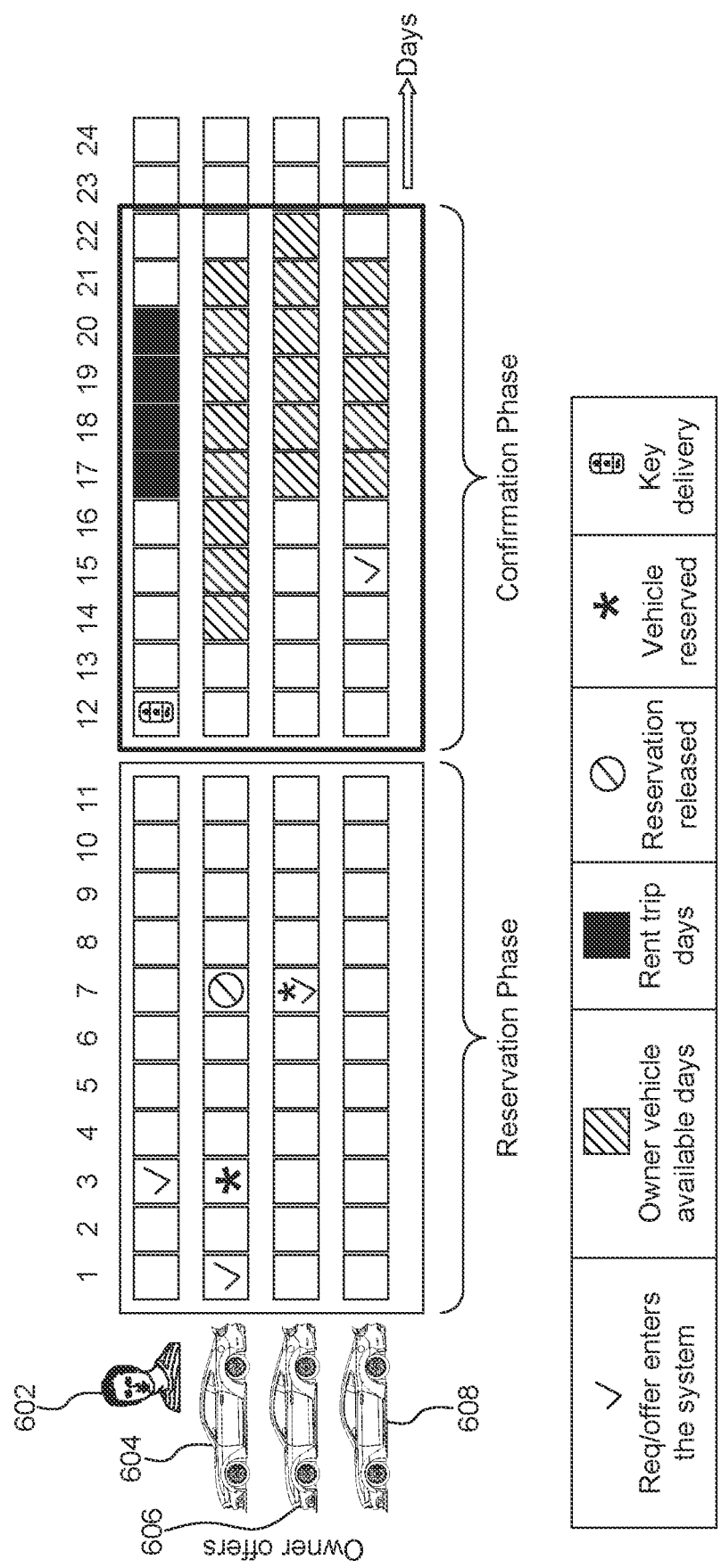
FIG. 6 depicts an example embodiment of renting a vehicle in the P2P vehicle sharing system in accordance with the present disclosure.

FIG. 6 depicts an example embodiment of renting a vehicle in the P2P vehicle sharing system 200 in accordance with the present disclosure. In some aspects, an X-axis of FIG. 6 depicts different days, e.g., Day 1, 2, 3 and so on (shown by a plurality of boxes 1-24). Further, a Y-axis of FIG. 6 depicts a renter 602, and a plurality of vehicles (e.g., a vehicle 604, a vehicle 606, and a vehicle 608) that may be available for rent. In particular, FIG. 6 illustrates a two-step process of renting the vehicle, from the plurality of vehicles, by the renter 602. The process may be divided into two phases, e.g., a reservation phase and a confirmation phase.

In the reservation phase, the renter 602 may send a rent request to rent the vehicle for four days, as indicated by Days 17-20 corresponding to the renter 602. The renter 602 may send the rent request on Day 3 to the P2P system 200. As described above, responsive to receiving the rent request, the processor 218 may obtain a set of available vehicles for the renter 602.

In the embodiment shown in FIG. 6, a vehicle 604 owner (e.g., a first owner, not shown) may offer to rent the vehicle 604 on the P2P system 200. As indicated in FIG. 6, the first owner may offer the vehicle 604 on Day 1, and the vehicle 604 may be available for rent from Days 14 to 21. Thus, in this embodiment, the processor 218 may determine that one vehicle (e.g., the vehicle 604) may be available for the renter 602. As depicted in FIG. 6, the vehicle 604 may be available for eight days, including the four days for which the renter 602 wants to rent the vehicle. Thus, the processor 218 may reserve the vehicle 604 on Day 3 for the renter 602 and may transmit a notification associated with the reservation to the renter 602 and the first owner. In some aspects, the notification transmitted in the reservation phase may not include the vehicle 604 VIN, and/or the first owner or the renter 602 details, until a confirmation phase start. For example, the notification in the reservation phase may include a message to the renter 602, stating that "A vehicle is reserved for you", and to the first owner stating that "A renter is assigned for your vehicle".

In accordance with further aspects, the processor 218 may receive a new vehicle (e.g., the vehicle 606) in the P2P system 200 on Day 7. The vehicle 606 may be available for rent from Days 17 to 22. Responsive to the vehicle 606 receipt, the processor 218 may add the vehicle 606 to the set of available vehicles. As discussed above, responsive to receiving a predefined trigger event (including the addition of a new vehicle), the processor 218 may dynamically re-evaluate the potential and best vehicle match for the renter 602 (or generate or update the list of edges). For instance, the processor 218 may determine a rental duration overlap extent (identified from the rent request) with the set of available vehicles' availability periods, for example, the vehicles 604 and 606, to identify the best vehicle match. For example, in the embodiment depicted in FIG. 6, the processor 218 may determine that the vehicle 606 is a better match over the vehicle 604 for the renter 602, as the overlap extent is 50% for the vehicle 604, and approximately 67% for the vehicle 606. In other words, if the processor 218 reserves the vehicle 604 for the renter 602, then four vehicle 604 available days may not be utilized, and thus the vehicle 604 utilization may not be optimum. On the other hand, if the processor 218 reserves the vehicle 606 for the renter 602, then only two vehicle 606 available days may not be utilized. Thus, the processor 218 may reserve the vehicle 606 for the renter 602 and release the vehicle 604 for other requests/renters. In this manner, the processor 218 may optimize vehicle utilization for the available vehicles in the P2P system 200.

In the scenario described above, the processor 218 may identify a different renter for the vehicle 604, before the processor 218 releases the vehicle 604 reservation. Specifically, the processor 218 may reserve the vehicle 606 for the renter 602 only when there exists another match for the vehicle 604. Stated another way, the processor 218 may change the "match" for the renter 602 if the processor 218 finds another match for the vehicle 604 (and the vehicle 604 may not go from matched state to unmatched state). In some aspects, the processor 218 may find the "other match" for the vehicle 604 such that the other match offers same or better vehicle utilization for the vehicle 604 than the renter 602 request. Thus, the processor 218 may update the match to have same or better outcome (i.e. better utilization, better revenue, etc.) for both the renter 602 and the vehicle 604.

In accordance with further aspects, the processor 218 may transmit, via the transceiver 216, the vehicle 606 VIN, to the renter 602 (e.g., via a renter device) at a confirmation phase start. In some aspects, the confirmation phase may begin a predetermined number of days (e.g., five days) before a rental duration start (e.g., Day 17). In addition to sending the vehicle 606 VIN, the processor 218 may transmit instructions to the renter 602 to submit a request for vehicle authorization to a vehicle 606 owner. Responsive to the VIN and the instructions receipt, the renter 602 may transmit, via the renter device, the vehicle authorization request to the vehicle 606 owner, via the P2P system 200.

In one or more aspects, responsive to receiving the vehicle authorization request, the vehicle 606 owner may approve the request within a specific time period (e.g., within 24 hours of receiving the request). The agreement of vehicle renting may become binding when the vehicle 606 owner approves the request. At this stage, the processor 218 may transmit a remote key (or a vehicle access code) to the renter 602, via the transceiver 216, so that the renter 602 may use the vehicle 606 during the rental duration.

In some aspects, the processor 218 may fix or finalize the reservation of vehicle 606 for the renter 602 when the agreement becomes binding. In other words, the processor 218 may not re-evaluate (or may deactivate re-evaluation of) the vehicle 606 reservation, when the vehicle 606 is in the confirmation phase. For instance, as depicted in FIG. 6, the vehicle 608 may become available during the confirmation phase and may offer a better match for the renter 602, over the vehicle 606. However, since the vehicle 606 is already reserved and confirmed for the renter 602, the processor 218 may not re-evaluate the reservation process for the renter 602, even if the vehicle 608 offers a better match (e.g., the vehicle 608 offers 80% overlap with the rental duration).

Figure 7:
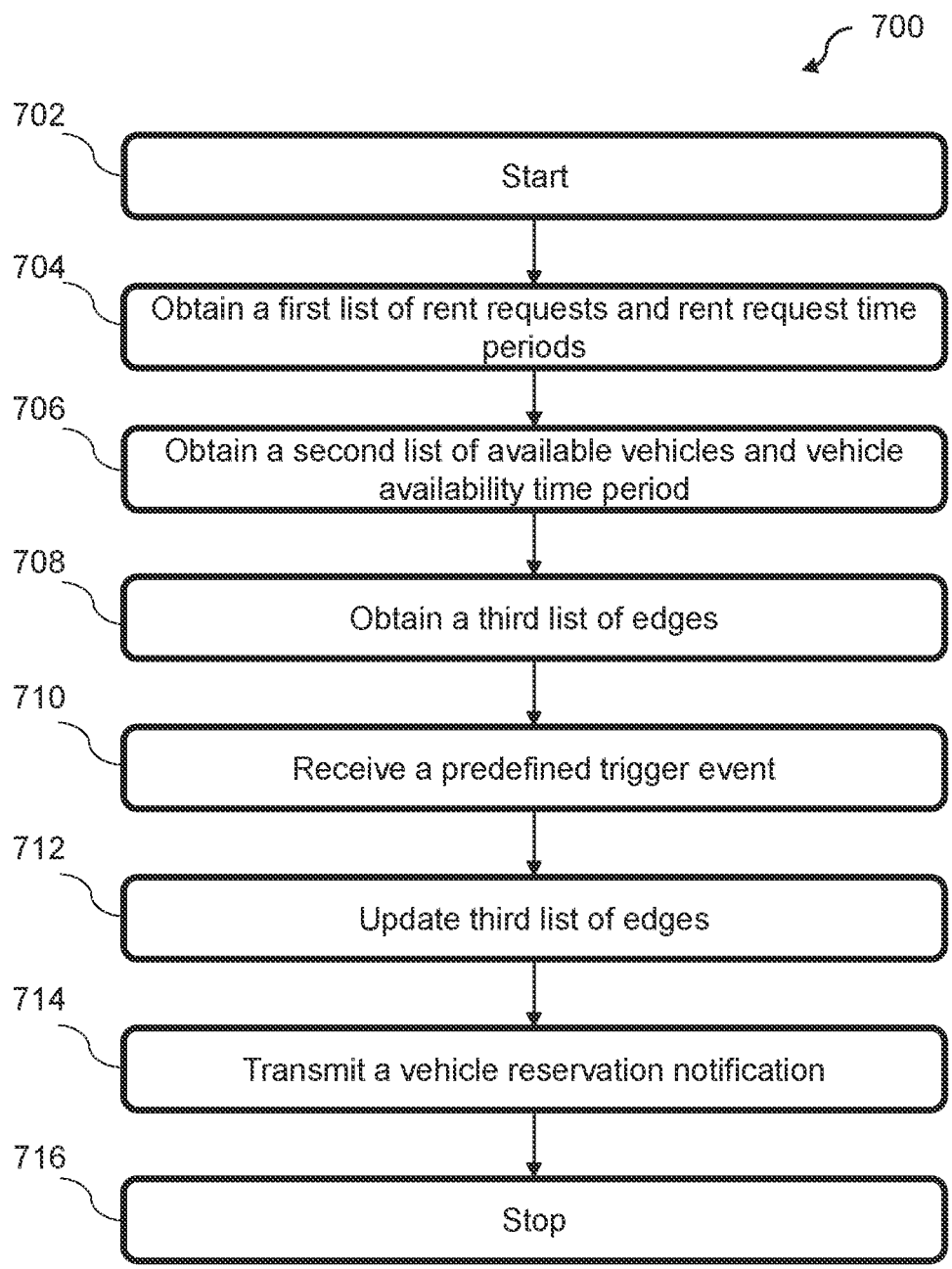
FIG. 7 depicts a flow diagram of an example method for reserving a vehicle, in accordance with the present disclosure.

FIG. 7 depicts a flow diagram of an example method 700 for reserving a vehicle (by the processor 218), in accordance with the present disclosure. FIG. 7 may be described with continued reference to prior figures, including FIGS. 1-6. The following process is exemplary and not confined to the steps described hereafter. Moreover, alternative embodiments may include more or less steps that are shown or described herein and may include these steps in a different order than the order described in the following example embodiments.

The method 700 may start at step 702. At step 704, the method 700 may include obtaining, via the processor 218, a list of rent requests and associated requested rental durations. The list of rent requests may be associated with the renters 112, and the processor 218 may obtain the list of rent requests via the renter devices 114. The list of rent requests may represent first nodes (same as the second plurality of nodes 304) of a vehicle-renter graph (e.g., the graph 300). The details of the list of rent requests and the vehicle-renter graph 300 may be understood in conjunction with FIGS. 2 and 3.

At step 706, the method 700 may include obtaining, by the processor 218, a list of available vehicles and associated vehicle availability time periods. The list of available vehicles may be associated with the vehicle owners 204, and the processor 218 may obtain the list of available vehicles via the vehicle owner devices 206. The list of available vehicles may represent second nodes (same as the first plurality of nodes 302) of the vehicle-renter graph. The details of the list of available vehicles may be understood in conjunction with FIG. 2.

At step 708, the method 700 may include obtaining, by the processor 218, a list of edges. The processor 218 may obtain the list of edges from the memory 220. The edges may connect at least one first node and at least one second node. In some aspects, a requested rental duration associated with the at least one first node may be a subset of a vehicle availability time period associated with the at least one second node. The details of the edges may be understood in conjunction with FIG. 3.

At step 710, the method 700 may include receiving, by the processor 218, a predefined trigger event. The predefined trigger event may include at least one of a new rent request entry, a new available vehicle entry, an existing available vehicle withdrawal, or an existing rent request withdrawal.

At step 712, the method 700 may include updating, via the processor 218, the list of edges responsive to receiving the predefined event. The details of updating the list of edges may be understood in conjunction with FIGS. 2-6. At step 714, the method 700 may include transmitting, via the processor 218, a vehicle reservation notification to at least one renter and at least one vehicle owner based on the updated list of edges. In particular, the method 700 may include transmitting notifications to at least one renter and at least one vehicle owner to indicate mapping of the renter and the available vehicle, which indicates available vehicle reservation for the renter. The method ends at 716.

In the above disclosure, reference has been made to the accompanying drawings, which form a part hereof, which illustrate specific implementations in which the present disclosure may be practiced. It is understood that other implementations may be utilized, and structural changes may be made without departing from the present disclosure scope. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A peer-to-peer (P2P) vehicle sharing method comprising:
    obtaining, by a processor, a list of rent requests and associated requested rental durations;
    determining, by the processor, a first set of nodes, wherein the list of rent requests is represented by the first set of nodes;
    storing, by the processor, the first set of nodes in a request table;
    obtaining, by the processor, a list of available vehicles and associated vehicle availability time periods;
    determining, by the processor, a second set of nodes, wherein the list of available vehicles is represented by the second set of nodes;
    storing, by the processor, the second set of nodes in the request table;
    generating, by the processor, a set of edges that correspond to potential matches between the associated requested rental durations of the list of rent requests and the associated vehicle availability time periods of the list of available vehicles, wherein each edge of the set of edges encodes a potential match between a first node of the first set of nodes and a second node of the second set of nodes;
    storing, by the processor, the set of edges in an edge table that is separate from the request table;

performing, by the processor, and using the edge table, an edge selection procedure that utilizes a Mixed Integer Linear Program (MILP) to match the first set of nodes with the second set of nodes based at least in part on an objective function comprising a plurality of weights and corresponding functions associated with maximizing a number of matches, maximizing vehicle utilization, and giving preference to vehicles from the list of available vehicles that match rent requests from the list of rent requests, to determine a list of edges selected by the edge selection procedure;

receiving, by the processor, a predefined trigger event comprising at least one of: a new rent request entry, a new available vehicle entry, an existing available vehicle withdrawal, or an existing rent request withdrawal;

updating, by the processor, the request table in response to receiving the predefined trigger event;

updating, by the processor, the edge table based at least in part on one or more results of the updating of the request table;

performing, by the processor, the edge selection procedure using solely the edge table after the updating of the edge table, to determine an updated list of edges selected by the edge selection procedure;

electronically transmitting, by the processor, a vehicle reservation notification to at least one renter and at least one owner of a vehicle based on the updated list of edges;

determining, by the processor, a vehicle parking location for the vehicle provided by the at least one owner;

navigating, by the processor, the at least one renter to the vehicle parking location by at least using a Global Positioning System (GPS) of a mobile device of the at least one renter;

determining, based at least in part on the GPS of the mobile device, when the at least one renter reaches the vehicle; and responsive to determining that the at least one renter has reached the vehicle, unlocking a door of the vehicle by at least sending, by the processor, a vehicle door unlock command to the vehicle.

2. The P2P vehicle sharing method of claim 1, further comprising:

updating the list of rent requests or the list of available vehicles in response to receiving the predefined trigger event, wherein updating the list of edges comprises determining edges that connect updated rent requests and updated available vehicles.

3. The P2P vehicle sharing method of claim 1, wherein:

the edge table further comprises a set of utilization states corresponding to the set of edges; and the edge selection procedure is performed, by the processor, based at least in part on the set of utilization states.

4. The P2P vehicle sharing method of claim 1 further comprising:

selecting an edge from the updated list of edges, wherein an edge selection is based on a predefined criterion, wherein the vehicle reservation notification is transmitted based on the edge selection.

5. The P2P vehicle sharing method of claim 4, wherein the predefined criterion comprises available vehicles rent offer dates.

6. The P2P vehicle sharing method of claim 4, wherein the predefined criterion comprises a maximization of vehicle utilization, and wherein vehicle utilization is a ratio of the requested rental duration and the vehicle availability time period.

7. The P2P vehicle sharing method of claim 4, wherein the predefined criterion comprises a maximization of a vehicle rent revenue.

8. A peer-to-peer (P2P) vehicle sharing system comprising:

a processor; and a memory for storing executable instructions, the processor programmed to execute instructions to:

obtain a list of rent requests and associated requested rental durations;

determine a first set of nodes, wherein the list of rent requests is represented by the first set of nodes;

store the first set of nodes in a request table;

obtain a list of available vehicles and associated vehicle availability time periods;

determine a second set of nodes, wherein the list of available vehicles is represented by a second set of nodes;

store the second set of nodes in the request table;

generate a set of edges that correspond to potential matches between the associated requested rental durations of the list of rent requests and the associated vehicle availability time periods of the list of available vehicles, wherein each edge of the set of edges encodes a potential match between a first node of the first set of nodes and a second node of the second set of nodes;

store the set of edges in an edge table that is separate from the request table;

perform, using the edge table, an edge selection procedure that utilizes a Mixed Integer Linear Program (MILP) to match the first set of nodes with the second set of nodes based at least in part on an objective function comprising a plurality of weights and corresponding functions associated with maximizing a number of matches, maximizing vehicle utilization, and giving preference to vehicles from the list of available vehicles that match rent requests from the list of rent requests, to determine a list of edges selected by the edge selection procedure;

receive a predefined trigger event comprising at least one of: a new rent request entry, a new available vehicle entry, an existing available vehicle withdrawal, or an existing rent request withdrawal;

update the request table in response to receipt of the predefined trigger event;

update the edge table based at least in part on one or more results of the updating of the request table;

perform the edge selection procedure using solely the edge table after the updating of the edge table, to determine an updated list of edges selected by the edge selection procedure;

electronically transmit a vehicle reservation notification to at least one renter and at least one owner of a vehicle based on the updated list of edges;

determine a vehicle parking location for the vehicle provided by the at least one owner;

navigate the at least one renter to the vehicle parking location by at least using a Global Positioning System (GPS) of a mobile device of the at least one renter;

determine, based at least in part on the GPS of the mobile device, when the at least one renter reaches the vehicle; and responsive to a determination that the at least one renter has reached the vehicle, unlock a door of the vehicle by at least sending a vehicle door unlock command to the vehicle.

9. The P2P vehicle sharing system of claim 8, wherein the processor is further programmed to execute the instructions to:
update the list of rent requests or the list of available vehicles in response to receiving the predefined trigger event,
wherein the processor updates the list of edges by determining edges that connect updated rent requests and updated available vehicles.

10. The P2P vehicle sharing system of claim 8, wherein:
the edge table further comprises a set of utilization states corresponding to the set of edges; and
the edge selection procedure is performed, by the processor, based at least in part on the set of utilization states.

11. The P2P vehicle sharing system of claim 8, wherein the processor is further programmed to execute the instructions to:
select an edge from the updated list of edges, wherein an edge selection is based on a predefined criterion,
wherein the processor transmits the vehicle reservation notification based on the edge selection.

12. The P2P vehicle sharing system of claim 11, wherein the predefined criterion comprises available vehicles rent offer dates.

13. The P2P vehicle sharing system of claim 11, wherein the predefined criterion comprises maximization of vehicle utilization, and wherein vehicle utilization is a ratio of the requested rental duration and the vehicle availability time period.

14. The P2P vehicle sharing system of claim 11, wherein the predefined criterion comprises maximization of a vehicle rent revenue.

15. A non-transitory computer-readable storage medium having instructions stored thereupon which, when executed by a processor, cause the processor to:
obtain a list of rent requests and associated requested rental durations;
determine a first set of nodes, wherein the list of rent requests is represented by the first set of nodes;
store the first set of nodes in a request table;
obtain a list of available vehicles and associated vehicle availability time periods;
determine a second set of nodes, wherein the list of available vehicles is represented by the second set of nodes;
store the second set of nodes in the request table;
generate a set of edges that correspond to potential matches between the associated requested rental durations of the list of rent requests and the associated vehicle availability time periods of the list of available vehicles, wherein each edge of the set of edges encodes a potential match between a first node of the first set of nodes and a second node of the second set of nodes;
store the set of edges in an edge table that is separate from the request table;
perform, using the edge table, an edge selection procedure that utilizes a Mixed Integer Linear Program (MILP) to match the first set of nodes with the second set of nodes based at least in part on an objective function comprising a plurality of weights and corresponding functions associated with maximizing a number of matches, maximizing vehicle utilization, and giving preference to vehicle from the list of available vehicles that match rent requests from the list of rent requests, to determine a list of edges selected by the edge selection procedure;
receive a predefined trigger event comprising at least one of: a new rent request entry, a new available vehicle entry, an existing available vehicle withdrawal, or an existing rent request withdrawal;
update the request table in response to receipt of the predefined trigger event, thereby producing an updated list of edges;
update the edge table based at least in part on one or more results of the updating of the request table;
perform the edge selection procedure using solely the edge table after the updating of the edge table, to determine an updated list of edges selected by the edge selection procedure;
electronically transmit a vehicle reservation notification to at least one renter and at least one owner of a vehicle based on the updated list of edges;
determine a vehicle parking location for the vehicle provided by the at least one owner;
navigate the at least one renter to the vehicle parking location by at least using a Global Positioning System (GPS) of a mobile device of the at least one renter;
determine, based at least in part on the GPS of the mobile device, when the at least one renter reaches the vehicle; and
responsive to a determination that the at least one renter has reached the vehicle, unlock a door of the vehicle by at least sending a vehicle door unlock command to the vehicle.

16. The non-transitory computer-readable storage medium of claim 15, having further instructions stored thereupon to:
update the list of rent requests or the list of available vehicles in response to receiving the predefined trigger event,
wherein the processor updates the list of edges by determining edges that connect updated rent requests and updated available vehicles.

* * * * *